United States Patent
Xie

(10) Patent No.: US 8,608,999 B2
(45) Date of Patent: Dec. 17, 2013

(54) METHOD OF FABRICATING SHAPE MEMORY POLYMER-BASED THREE-DIMENSIONAL DEVICES

(75) Inventor: Tao Xie, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 15 days.

(21) Appl. No.: 13/102,143

(22) Filed: May 6, 2011

(65) Prior Publication Data

US 2012/0280422 A1 Nov. 8, 2012

(51) Int. Cl.
*B29C 71/00* (2006.01)

(52) U.S. Cl.
USPC ........................................................ 264/237

(58) Field of Classification Search
USPC ........................................................ 264/237
See application file for complete search history.

(56) References Cited

U.S. PATENT DOCUMENTS

2006/0036045 A1* 2/2006 Wilson et al. ................. 525/452
2011/0071271 A1 3/2011 Xie et al.

OTHER PUBLICATIONS

Tao Xie, Xingcheng Xiao, Yang-Tse Cheng, "Revealing Triple-Shape Memory Effect by Polymer Bilayers", Macromolecular Rapid Comunications, 2009, pp. 1823-1827, vol. 30, Wiley InterScience.
Tao Xie. "Tunable polymer multi-shape memory effect", Mar. 11, 2010, pp. 267-270, vol. 464, Macmillan Publishers Limited.

* cited by examiner

*Primary Examiner* — Larry Thrower
(74) *Attorney, Agent, or Firm* — Quinn Law Group, PLLC

(57) ABSTRACT

A method of fabricating a three-dimensional geometrically complex device is provided, based on a shape memory polymer. The method includes selecting a substrate composed of a shape memory polymer. A filling material is deposited in or on a planar surface of the substrate, thereby forming the device. The planar surface of the substrate may be in either a temporary or original shape of the substrate. Prior to the deposition of the filling material, the substrate is transformed into a first shape having a planar surface if the original shape of the substrate does not have a planar surface. The device is configured to be thermo-mechanically tunable to display a plurality of geometrically complex shapes, under a series of temperature changes and stress.

17 Claims, 2 Drawing Sheets

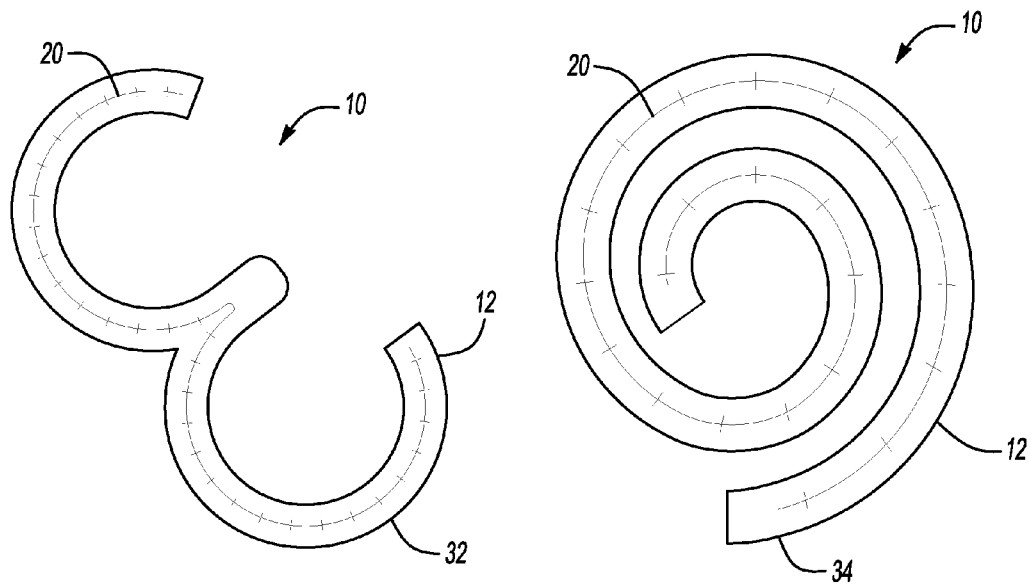
*Fig-5*
*Fig-6*
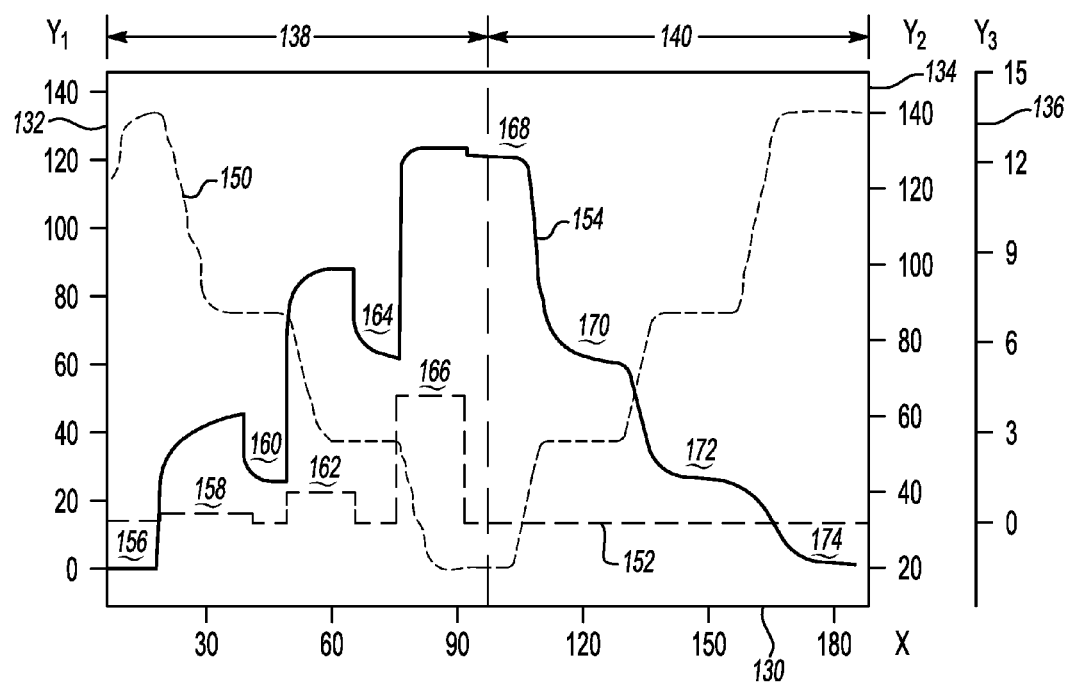
*Fig-7*

METHOD OF FABRICATING SHAPE MEMORY POLYMER-BASED THREE-DIMENSIONAL DEVICES

TECHNICAL FIELD

The present invention relates generally to a method of fabricating a three-dimensional geometrically complex device, based on a shape memory polymer.

BACKGROUND

Many devices are in planar form due to the difficulty of fabricating devices in three-dimensional geometrically complex shapes. For example, in printed electronics, layers of ink are applied one atop another in order to create electrical devices. However, typically the printing methods can only be applied to planar surfaces. Thus, a device requiring the application of ink or other materials would be difficult to fabricate in a three-dimensional geometrically complex shape.

SUMMARY

A method of fabricating a three-dimensional geometrically complex device is provided, based on a shape memory polymer. The method includes selecting a substrate composed of a shape memory polymer. A filling material is deposited in or on a planar surface of substrate, thereby forming the device. The planar surface of the substrate may be in either a temporary or original shape of the substrate. Prior to the deposition of the filling material, the substrate is transformed into a first shape having a planar surface, if the original shape of the substrate does not have a planar surface. The device is configured to be thermo-mechanically tunable to display a plurality of geometrically complex shapes, under a series of temperature changes and stress. After the fabrication, the shape-changing capability of the substrate allows the device to be reconfigured into three-dimensional non-planar or geometrically complex shapes. In one example, the substrate is composed of a perfluorosulfonic acid ionomer with a polytetrafluoroethylene (PTFE) backbone and perfluoroether sulfonic acid side chains. In another example, the substrate is composed of an epoxy shape memory polymer obtained by reacting a mixture of an aromatic diepoxide and an aliphatic diepoxide with a multi-amine curing agent.

In one embodiment, an original shape of the substrate includes a planar surface. In this case, thermo-mechanically tuning the device includes heating the device to a first temperature under a first stress to produce a first geometrically complex shape and cooling the device to a second temperature under the first stress to fix the first geometrically complex shape. The device may be deformed under a second stress and cooled to a third temperature to produce a second geometrically complex shape. The device may be deformed under a third stress and cooled to a fourth temperature to produce a third geometrically complex shape. Reheating the device to the third temperature allows the recovery of the second geometrically complex shape. Reheating the device to the second temperature allows the recovery of the first geometrically complex shape. Reheating the device to the first temperature allows the recovery of the original shape.

In another embodiment, an original shape of the substrate does not include a planar surface. Prior to the deposition of the filling material, the substrate in the original shape is heated to a first temperature under a first stress to produce a first temporary shape having a planar surface. The substrate is cooled to a second temperature under the first stress to fix the first temporary shape, also prior to the depositing of the filling material. After the deposition of the filling material on the planar surface of the first temporary shape, reheating the device to the first temperature allows the recovery of the original shape.

In another embodiment, the substrate may be a two-way reversible shape memory polymer that can change shape reversibly under a constant stress. Here, the device is thermo-mechanically tuned by heating to a first temperature under a stress to produce a first geometrically complex shape. The device is cooled to a second temperature under the same stress to produce a second geometrically complex shape. The device is configured to cycle reversibly between the first and second geometrically complex shapes while the same stress is maintained.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic plan view of the device in a third shape, in accordance with the present disclosure;

FIG. 6 is a schematic plan view of the device in a fourth shape, in accordance with the present disclosure;

FIG. 7 is a graph illustrating an example of a quadruple-shape memory cycle of a perfluorosulfonic acid ionomer used for forming the device of FIG. 1. Strain (%), temperature (° C.) and stress (MPa) are presented on vertical axes 132, 134 and 136, respectively. Time (minutes) is presented on the horizontal axis 130 and is in minutes.

DETAILED DESCRIPTION

Figure 1:
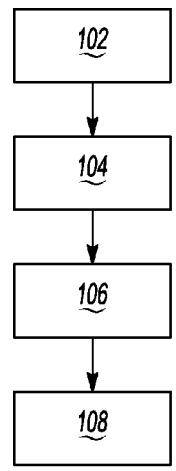
FIG. 1 is a schematic flow diagram describing a method of fabricating a three-dimensional geometrically complex device, in accordance with the present disclosure.
Figure 4:
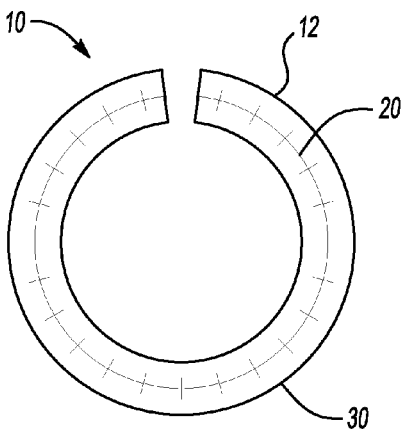
FIG. 4 is a schematic plan view of the device in a second shape, in accordance with the present disclosure.

Referring to the Figures, wherein like reference numbers refer to the same or similar components throughout the several views, FIG. 1 shows a method 100 of fabricating a device 10 (shown in FIGS. 4-6). The device 10 is configured to be thermo-mechanically tunable to display a plurality of geometrically complex shapes. The device 10 is derived from a substrate 12 (shown in FIG. 2) that is composed of a shape memory polymer.

Present shape memory polymers are materials that can memorize one or more temporary shapes and eventually revert to an original (also referred to as permanent) shape upon exposure to an external stimulus such as heat. In some shape memory polymers the external stimulus for shape change may be an electric or magnetic field, or light. A conventional shape memory polymer (SMP) is deformed at an elevated temperature (deformation temperature, $T_d$) and the deformed temporary shape is fixed upon cooling. Often this deformation temperature is above the glass transition temperature of the polymer composition. When heated to a recovery temperature ($T_r$), the temporary shape reverts to the original shape. With a total of two shapes involved in each shape memory cycle, such an effect is called dual-shape memory effect (DSME) where the two shapes consist of the deformed temporary shape and the original shape. Quantitatively, this effect is evaluated based on the percentage of shape fixation of the temporary shape (shape fixity $R_f$, i.e. the ratio between strain retained and strain imposed) and shape recovery of the original shape (shape recovery, $R_r$). At the molecular level, materials displaying the DSME typically possess a physical or chemical crosslinking mechanism for setting the original shape and a reversible polymer phase transition for fixing the temporary shape. A prototype shape memory cycle occurs with both shape fixation and recovery above a reversible phase transition temperature (or the shape memory transition temperature, $T_{trans}$).

In contrast to polymer materials displaying dual-shape memory effect, a triple-shape memory effect has also been observed in some polymers. Triple-shape memory effect refers to the capability of some combinations of polymer materials to memorize a second temporary shape (three shapes are involved) using an additional reversible phase transition in the polymer composition. The fixation of two temporary shapes in a body of the polymer (and subsequent shape recovery) for a triple-shape memory polymer is achieved either above or between two transition temperatures existing in the mixed polymer composition.

Referring to FIG. 1, in step 102, a substrate 12 (shown in FIG. 2) is selected to be composed of a shape memory polymer. In step 104, the substrate 12 is transformed into a shape suitable for deposition of a filling material 20, such as a first shape 14 having a planar surface 22. If an original shape of the substrate 12 has a planar surface 22, this step is not required, as described below. Next, in step 106, a filling material 20 is deposited in or on the substrate 12 on the planar surface 22, thereby forming the device 10. The filling material 20 may remain attached to the planar surface 22 of the substrate 12 or may be embedded inside the substrate 12.

Figure 2:
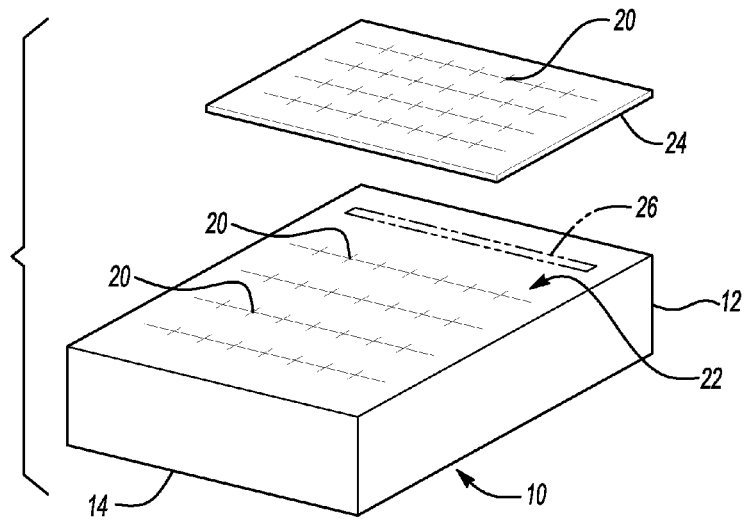
FIG. 2 is a schematic exploded illustration of a portion of the method of FIG. 1, showing the deposition of a filling material in a substrate that is in a first shape.

Referring to FIG. 2, an example of step 106 is shown. In this example, a filling material 20 such as single-walled carbon nanotubes or metallic ink is coated onto a thin layer or film 24. A metal film 24 such as aluminum, copper or palladium may be used. The film 24 is placed above the substrate 12. The filling material 20 may be bound to the substrate 12 either directly or indirectly with an adhesive. The film 24 is then removed using a suitable etching agent, leaving the carbon nanotubes or metallic ink on the substrate 12. For example, if the film 24 is composed of metal, an acid solvent may be used to dissolve the film 24.

Referring to FIG. 2, optionally, the substrate 12 may be formed with at least one cavity 26 for receiving the filling material 20. Optionally, the filling material 20 may be embedded into the substrate 12 as a solid. Optionally, the filling material 20 may be deposited on the substrate 12 as a fluid and solidified by evaporation, thermal curing or any other method. The filling material 20 may be a metallic ink, non-metallic ink, an organic semiconductor, inorganic semiconductor, a metallic conducting particle, a nanoparticle, a nanotube such as a single-walled carbon nanotube or any other material. The filling material 20 may be deposited by solution printing, vacuum printing or other suitable methods. Solution printing refers to processes where the filling material 20 is dispersed into a carrier medium and delivered or sprayed to selected regions of the substrate 12. Printing methods such as inkjet, lithography, screen printing, flexography, rotogravure or any other suitable method may be employed.

Figure 3:
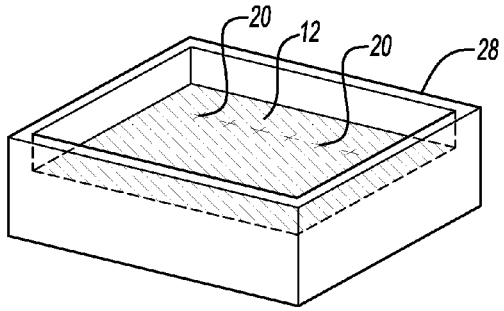
FIG. 3 is a schematic illustration of an alternative portion of the method of FIG. 1, showing the deposition of a filling material in a substrate that is in a liquid form.

In an alternative embodiment, in step 104, the substrate 12 is obtained in a shape suitable for deposition of a filling material 20 by transforming the substrate 12 into a liquid form. Referring to FIG. 3, the substrate 12 in a liquid form is placed in a reservoir or container 28. In step 106, a filling material 20 is deposited into the substrate 12. The combination of the substrate 12 and filling material 20 is then solidified, forming the device 10 (shown in FIGS. 4-6). The solidification may be achieved by thermal curing, evaporation or any suitable method.

Referring to FIG. 1, in step 108, the device 10 is thermo-mechanically tuned to display a plurality of geometrically complex shapes. The device 10 is illustrated in a plurality of geometrically complex shapes such as second, third and fourth shapes 30, 32 and 34 in FIGS. 4-6, respectively. The second, third and fourth shapes 30, 32 and 34 are intended to be exemplary only and non-limiting. The device 10 may be thermo-mechanically tuned to display an unlimited variety of shapes, in other words, any possible shape. One of ordinary skill in the art may appreciate the complexity of transferring a filling material 20 to a device 10 in the form shown in FIGS. 4-6. This illustrates the advantage of the present disclosure in employing a substrate 12 composed of a shape memory polymer.

In one embodiment, an original shape of the substrate 12 (such as the first shape 14 shown in FIG. 2) includes a planar surface 22. In this case, the filling material 20 is deposited in the substrate 12 while it is in the original shape (such as the first shape 14). Here, thermo-mechanically tuning the device 10 includes heating the device 10 to a first temperature $T_1$ under a first stress to produce a first geometrically complex shape, such as the second shape 30 illustrated in FIG. 4 or any other geometrically complex shape. The device 10 is cooled to a second temperature $T_2$ under the first stress to fix the first geometrically complex shape or second shape 30. The device 10 may be deformed under a second stress and cooled to a third temperature $T_3$ to produce a second geometrically complex shape, such as the third shape 32 illustrated in FIG. 5 or any other geometrically complex shape. The device 10 may be deformed under a third stress and cooled to a fourth temperature $T_4$ to produce a third geometrically complex shape, such as the fourth shape 34 illustrated in FIG. 6 or any other geometrically complex shape. For recovery, the device 10 in the third geometrically complex shape (such as fourth shape 34) is heated to the third temperature $T_3$ in the absence of stress to yield the recovered second geometrically complex shape (such as third shape 32). The recovered second geometrically complex shape or third shape 32 remains stable until the temperature is further increased to the second temperature $T_2$ which leads to the recovered first geometrically complex shape (such as second shape 30). The recovered first geometrically complex shape (such as second shape 30) remains stable until the temperature is further increased to the first temperature $T_1$ which leads to the recovered original shape (such as first shape 14).

In another embodiment, the original shape (which can be any shape) of the substrate 12 does not have a planar surface 22 (shown in FIG. 2). In this case, prior to the deposition of the filling material 20, the substrate 12 in an original shape is heated to a first temperature $T_1$ under a first stress to produce a first temporary shape, such as the first shape 14 shown in FIG. 2. The substrate 12 is cooled to a second temperature $T_2$ under the first stress to fix the first temporary shape (such as first shape 14). A filling material 20 is deposited in or on the substrate 12 on the planar surface 22, thereby forming the device 10. Upon heating to the first temperature $T_1$ in the absence of stress, the original shape (with no planar surface) is recovered. This device 10 can be further thermo-mechanically tuned to different temporary shapes as described above.

More specifically, thermo-mechanically tuning the device 10 includes cooling the device 10 to a third temperature $T_3$ and deforming under a second stress to produce a first geometrically complex shape, such as the second shape 30 illustrated in FIG. 4 or any other geometrically complex shape. The device 10 may be cooled to a fourth temperature $T_4$ and deformed under a third stress to produce a second geometrically complex shape, such as the third shape 32 illustrated in FIG. 5 or any other geometrically complex shape. For recovery, the device 10 in the second geometrically complex shape (such as third shape 32) is heated to the third temperature $T_3$ in the absence of stress to yield the recovered first geometrically complex shape (such as second shape 30). The recovered first geometrically complex shape (such as second shape 30) remains stable until the temperature is further increased to the second temperature $T_2$ which leads to the recovered first temporary shape (such as first shape 14). The recovered first temporary shape (such as first shape 14) remains stable until the temperature is further increased to the first temperature $T_1$ which leads to the recovered original shape.

The first, second and third stresses may be uniformly applied to the entire device 10 or locally applied to a portion of the device 10. The first, second and third stresses may take the form of mechanical tensile pressure or compressive pressure. The filling material 20 may deform along with the substrate 12 as it goes through the various cycles of heating, deformation under stress, cooling and reheating. If desirable, the filling material 20 may be used as a solid with a melting point in the range of the transition temperatures, such that it melts during the various cycles. Depending on the particular application, the filling material 20 may be selected to have a melting point within or outside the transition temperatures of the substrate 12.

In one embodiment, the substrate 12 may be a polymeric material having dual shape memory effect and capable of memorizing one temporary shape and reverting to an original shape upon activation by external stimuli such as heat (i.e. temperature changes), magnetism, light and moisture. For example, the substrate 12 may be epoxy. In another embodiment, the substrate 12 may be a polymeric material having triple-shape memory effect and capable of memorizing two temporary shapes and an original shape. For example, the substrate 12 may be a bi-layer polymeric material having a first layer obtained by curing a mixture of an aromatic diepoxide, an aliphatic diepoxide and a curing agent; and a second layer obtained by curing the same mixture at a different mixing ratio. In one example, the aromatic diepoxide is diglycidyl ether bisphenol A epoxy monomer (EPON 826 available from Hexion), the aliphatic diepoxide is neopentyl glycol diglycidyl ether (NGDE available from TCI America) and the curing agent is a polypropylene glycol)bis(2-aminopropyl)ether curing agent (Jeffamine D-230 available from Huntsman). In one example, the EPON 826 is mixed with the NGDE and Jeffamine D-230 at a mole ratio of 1.6:0.4:1 for the first layer and 0.8:1.2:1 for the second layer. The respective layers may be cured by heating at 100 degrees Celsius for one hour.

In another embodiment, the substrate 12 may be a two-way reversible shape memory polymer that can change shape reversibly under a constant stress. For example, the substrate 12 may be obtained by thermal curing a mixture of poly (ethylene-co-vinyl acetate) and dicumyl peroxide. The substrate 12 may also be a cross-linked poly(cyclooctene). In this case, the filling material 20 is deposited in the substrate 12 while in an original shape, such as the first shape 14 (shown in FIG. 1). The device 10 may be thermo-mechanically tuned by heating to a first temperature $T_1$ and deforming under a stress or load to obtain a first temporary shape, such as any of the second, third and fourth shapes 30, 32 and 34 illustrated in FIGS. 4-6 or any other geometrically complex shape. The device 10 is then cooled to a second temperature $T_2$ under the same stress to produce a second temporary shape, such as any of the second, third and fourth shapes 30, 32 and 34 illustrated in FIGS. 4-6 or any other geometrically complex shape. While maintaining the stress, the device 10 may cycle reversibly between the first temporary shape and the second temporary shape by changing the temperature. In other words, the device 10 may be heated to obtain the first temporary shape and cooled to obtain the second temporary shape, as long as the stress is maintained. When the stress is removed, the device 10 goes back to the original shape (such as first shape 14).

In another embodiment, the substrate 12 may be a polymeric material having quadruple-shape memory effect and capable of memorizing three temporary shapes and an original shape. For example, the substrate 12 may be a thermoplastic perfluorosulfonic acid ionomer with a polytetrafluoroethylene (PTFE) backbone and perfluoroether sulfonic acid side chains (NAFION®). The perfluorosulfonic acid ionomer is available from Dupont. The perfluorosulfonic acid ionomer is a single layer homogeneous material with a single broad glass transition range that incorporates a dual-, triple-, and quadruple-shape memory effect. The transition ranges from a first transition temperature of about 55° C. to a second transition temperature of about 130° C.

FIG. 7 shows the quadruple-shape memory effect for a device 10 derived from a substrate 12 composed of the perfluorosulfonic acid ionomer. Time is presented on the horizontal axis 130 and is in minutes. Strain, temperature and stress are presented on vertical axes 132, 134 and 136, respectively. The fixing stage of the graph is shown by the numeral 138 and the recovery stage by the numeral 140. Temperature is shown by line 150 (solid line) and is in Celsius units. Stress (MPa) is shown by line 152 (dash line) and is in units of Mega Pascal. Strain is shown by line 154 (solid bold line) and reflects percentage change in size or dimension with respect to the original dimension or size.

As demonstrated in FIG. 7, starting as an original (also referred to as permanent) shape A, the ionomer can memorize three temporary shapes B, C, and D in each shape memory cycle. Referring to the fixing stage 138 of the graph, the ionomer in the original shape A (shown at 156) was first heated to 140° C. and subjected to a relatively low stress of 0.3 MPa (shown at 158) as the ionomer was cooled at 5° C./min to 90° C. A first temporary shape B (shown at 160) having a strain of about 27% was set at this temperature. A larger stress of about 1.5 MPa (shown at 162) was applied as the ionomer was cooled to about 53° C. to set the ionomer in a second temporary shape C (shown at 164). When the stress was removed, the strain in the second temporary shape C (relative to the original shape) settled down at about 60%. A much larger stress of about 4.3 MPa (shown at 166) was applied as the ionomer was cooled to about 20° C. to set the ionomer in a third temporary shape D (shown at 168). When the stress was removed, the strain in the third temporary shape D settled down at about 120%.

Turning to the recovery stage 140 of the graph, the thrice-deformed ionomer (D) was heated to about 53° C. to obtain a recovered second temporary shape C (shown at 170). When the ionomer in the recovered second temporary shape C was heated to about 90° C., a recovered first temporary shape B (shown at 172) was obtained. When the ionomer in the recovered first temporary shape B was heated to 140° C., a recovered original shape A (shown at 174) was obtained.

In FIG. 7, first, second, third and fourth temperatures $T_1$, $T_2$, $T_3$, $T_4$ of 140° C., 90° C., 53° C. and 20° C., respectively, were used. The first, second, third and fourth temperatures $T_1$, $T_2$, $T_3$, $T_4$ may be varied. Other examples of first, second, third and fourth temperatures [$T_1$, $T_2$, $T_3$, $T_4$] include [120° C., 90° C., 55° C., 20° C], [110° C., 85° C., 55° C., 15° C.] and [140° C., 110° C., 60° C., 20° C]. Thus, a device 10 derived from a substrate 12 composed of the perfluorosulfonic acid ionomer has an original shape at a first relatively high temperature and a selected strain level and three or more temporary shapes at progressively lower temperatures and different strain levels. The device 10 may be initially used in its third temporary shape D indefinitely at a temperature below its lowest strain temperature. As the device 10 experiences increasing temperatures (or other suitable stimulus) it progressively transforms its shape from its third temporary shape D to its second temporary shape C, and from its second temporary shape C to its first temporary shape B, and from its first temporary shape B to its original shape A.

In summary, the device 10 is suitable for a wide range of applications as it provides useful properties and mechanical ruggedness in flexed, stretched, compressed and deformed orientations. For example, the device 10 may be employed in portable consumer electronics. The device 10 may be employed for both electronic and non-electronic applications.

While the best modes for carrying out the invention have been described in detail, those familiar with the art to which this invention relates will recognize various alternative designs and embodiments for practicing the invention within the scope of the appended claims.

The invention claimed is:

1. A method of fabricating a three-dimensional device, the method comprising:
   selecting a substrate composed of a shape memory polymer;
   prior to depositing a filling material:
      transforming the substrate into a first shape if an original shape of the substrate does not have a planar surface, the first shape having the planar surface, and coating the filling material onto a film;
   depositing the filling material in or on the planar surface of the substrate, thereby forming the device;
   wherein depositing the filling material in or on the planar surface of the substrate includes:
      binding the film to the planar surface of the substrate with an adhesive, after binding, removing the film from the planar surface of the substrate with an agent while leaving the filling material on the planar surface; and
   thermo-mechanically tuning the device to display a plurality of geometrically complex shapes.

2. The method of claim 1, wherein the filling material is a carbon nanotube.

3. The method of claim 1, wherein the filling material is metallic.

4. The method of claim 1, further comprising:
   forming at least one cavity in the planar surface of the cavity prior to the depositing of the filling material, the cavity being configured to receive the filling material.

5. The method of claim 1, wherein the shape memory polymer is an epoxy-thermosetting polymeric material.

6. The method of claim 1, wherein the shape memory polymer is perfluorosulfonic acid ionomer with a polytetrafluoroethylene (PTFE) backbone and perfluoroether sulfonic acid side chains.

7. The method of claim 1, wherein the planar surface is in the original shape of the substrate, and wherein thermo-mechanically tuning the device includes:
   heating the device to a first temperature under a first stress to produce a first geometrically complex shape; and
   cooling the device to a second temperature under the first stress to fix the first geometrically complex shape.

8. The method of claim 7, wherein thermo-mechanically tuning the device includes:
   deforming under a second stress and cooling the device to a third temperature to produce a second geometrically complex shape.

9. The method of claim 8, wherein thermo-mechanically tuning the device includes:
   deforming under a third stress and cooling the device to a fourth temperature to produce a third geometrically complex shape;
   reheating the device to the third temperature to recover the second geometrically complex shape;
   reheating the device to the second temperature to recover the first geometrically complex shape; and
   reheating the device to the first temperature to recover the original shape.

10. The method of claim 1, wherein an original shape of the substrate does not have a planar surface and transforming the substrate into the first shape prior to depositing the filling material includes:
    heating the substrate in the original shape to a first temperature under a first stress to produce the first shape; and
    cooling the substrate to a second temperature under the first stress to fix the first shape.

11. The method of claim 10, wherein thermo-mechanically tuning the device includes:
    deforming under a second stress and cooling the device to a third temperature to produce a first geometrically complex shape.

12. The method of claim 11, wherein thermo-mechanically tuning the device includes:
    deforming under a third stress and cooling the device to a fourth temperature to produce a second geometrically complex shape;
    reheating the device to the third temperature to recover the first geometrically complex shape;
    reheating the device to the second temperature to recover the first temporary shape; and
    reheating the device to the first temperature to recover the original shape.

13. The method of claim 1:
    wherein the plurality of geometrically complex shapes includes a first temporary shape and a second temporary shape;
    wherein thermo-mechanically tuning the device includes:
       heating the device to a first temperature under a stress to produce the first temporary shape;
       cooling the device to a second temperature under the stress to produce the second temporary shape; and
       wherein the device is configured to cycle reversibly between the first and second temporary shapes while the stress is maintained.

14. The method of claim 13, wherein the shape memory polymer is a obtained by curing a mixture of poly(ethylene-co-vinyl acetate) and dicumyl peroxide.

15. The method of claim 13, wherein the filling material is a carbon nanotube.

16. The method of claim 13, wherein the filling material is metallic.

17. The method of claim 1:
wherein the film is composed of a metal; and
wherein the agent is an acid solvent.

* * * * *